US010141580B2

(12) United States Patent
Bakker

(10) Patent No.: US 10,141,580 B2
(45) Date of Patent: Nov. 27, 2018

(54) BATTERY

(71) Applicant: BATTERY RESEARCH TECHNOLOGY LIMITED, Wan Chai, Hong Kong (CN)

(72) Inventor: Niels Bakker, Hong Kong (CN)

(73) Assignee: BATTERY RESEARCH TECHNOLOGY LIMITED, Wan Chai (HK)

(*) Notice: Subject to any disclaimer, the term of this patent is extended or adjusted under 35 U.S.C. 154(b) by 80 days.

(21) Appl. No.: 15/324,190

(22) PCT Filed: Jul. 6, 2015

(86) PCT No.: PCT/CN2015/083405
§ 371 (c)(1),
(2) Date: Jan. 5, 2017

(87) PCT Pub. No.: WO2016/004843
PCT Pub. Date: Jan. 14, 2016

(65) Prior Publication Data
US 2017/0170488 A1  Jun. 15, 2017

(30) Foreign Application Priority Data

Jul. 7, 2014 (HK) .................................. 14106838.7

(51) Int. Cl.
*H01M 4/02* (2006.01)
*H01M 6/32* (2006.01)
*H01M 2/18* (2006.01)
*H01M 6/34* (2006.01)

(52) U.S. Cl.
CPC ............... *H01M 6/32* (2013.01); *H01M 2/18* (2013.01); *H01M 6/34* (2013.01)

(58) Field of Classification Search
CPC ........................................................ H01M 4/02
See application file for complete search history.

(56) References Cited

PUBLICATIONS

International Search Report & Written Opinion.

*Primary Examiner* — Jacob B Marks
(74) *Attorney, Agent, or Firm* — Joseph G. Chu; JCIP

(57) ABSTRACT

A battery including a casing having an inner surface defining a chamber in which an electrolyte is disposed therein; a conductive surface located within the chamber adjacent the inner surface of the casing, the conductive surface being configured for electrical communication with an anode terminal of the battery; a permeable separator sheet located within the casing configured for electrically isolating the electrolyte from the conductive surface; a conductive rod having a first end configured for electrical communication with a cathode terminal of the battery, and, a second end of the conductive rod configured for electrical communication with the electrolyte; and an opening disposed in the casing; wherein the casing includes at least a first and second portion that are movably attached to each other, the first and second portions being movable relative to each other between at least a first attached position whereby the opening is substantially blocked from allowing ingress of a liquid into the casing via the opening, and, a second attached position whereby the opening is substantially unblocked so as to allow ingress of the liquid into contact with the electrolyte in the chamber via the opening to activate the battery by generating a potential difference between the conductive surface and the conductive rod.

12 Claims, 4 Drawing Sheets

BATTERY

TECHNICAL FIELD

The present invention relates to the field of reusable batteries and particularly batteries which are activated by addition of a liquid such as water.

BACKGROUND OF THE INVENTION

Conventional off-the-shelf type AA and AAA batteries tend to deteriorate in performance over time during storage. This can pose a serious problem where the reliability in performance of the batteries is of critical importance—for instance, in an emergency situation where the batteries are required to power a flashlight, a radio, a mobile telephone, or other potentially life-saving electronic device.

In seeking to address this problem, water-activatable batteries have been developed which can be stored for a relatively long period of time in an inactive state (that is, where water has not yet been mixed with the electrolyte powder mixture within the battery to activate the electrolyte powder mixture) without substantial loss in performance of the battery when the battery is subsequently activated by addition of water.

However, existing water activated batteries also exhibit certain drawbacks including that the structure and material composition of such batteries is still considered by some to be unduly complex and more costly than may be necessary to produce in volume. The structure of existing water-activated batteries is also such that parts of the batteries may be accidentally lost, thus rendering such batteries useless. This of course is undesirable particularly in an emergency situation.

Furthermore, during production of batteries, problems tend to arise in filling the battery casing with electrolyte powder. Specifically, when the electrolyte is being poured into the battery casings, the electrolyte powder tends to dog up the delivery channel which needs to be frequently cleaned out. This problem with clogging of the tube introduces unacceptable delays and inefficiencies in the production of batteries and affects the overall cost of production.

SUMMARY OF THE INVENTION

The present invention seeks to alleviate at least one of the problems discussed above in relation to the prior art.

The present invention may involve several broad forms. Embodiments of the present invention may include one or any combination of the different broad forms herein described.

In a first broad form, the present invention provides a battery including:

a casing having an inner surface defining a chamber in which an electrolyte is disposed therein;

a conductive surface located within the chamber adjacent the inner surface of the casing, the conductive surface being configured for electrical communication with an anode terminal of the battery;

a permeable separator sheet located within the casing configured for electrically isolating the electrolyte from the conductive surface;

a conductive rod having a first end configured for electrical communication with a cathode terminal of the battery, and, a second end of the conductive rod configured for electrical communication with the electrolyte; and an opening disposed in the casing;

wherein the casing includes at least a first and second portion that are movably attached to each other, the first and second portions being movable relative to each other between at least a first attached position whereby the opening is substantially blocked from allowing ingress of a liquid into the casing via the opening, and, a second attached position whereby the opening is substantially unblocked so as to allow ingress of the liquid into contact with the electrolyte in the chamber via the opening to activate the battery by generating a potential difference between the conductive surface and the conductive rod.

Preferably, the first and second portions may be movable relative to each other by at least one of a sliding, a rotating, a pivoting, a twisting, a pulling and a pushing movement.

Typically, the first and second portions of the casing may include parts of a valve of the casing for controllably allowing ingress of the liquid into the chamber.

Preferably, the casing may include a plastic material. More preferably, the plastic may include a recyclable plastic material.

Preferably, the conductive surface may include a conductive of the casing.

Preferably, the conductive surface may include zinc material.

Preferably, the conductive surface may include at least one of an abatement, a slot, and a series of apertures extending substantially along an elongate axis of the conductive surface.

Preferably, the at least one of an abatement, a slot and a series of apertures may be formed as a cut-out of the conductive surface.

Preferably, the anode terminal may be disposed in a first end portion of the casing, the first end portion including a combination of a plastic material and a metal material. Preferably, the plastic region may concentrically surround a core formed by the metal material Preferably, the present invention may include a spring configured for positioning within the casing to provide electrical communication between the conductive surface of the casing and the anode terminal.

Preferably, the electrolyte may include substantially spherical particles having diameters approximately in the range of around 0.2-0.8 mm.

Preferably, the electrolyte may include particles having densities in the range of approximately 1.71-1.75 g/cm3.

Preferable, the particles may include water content of approximately 3% or less.

In a second broad form, the present invention provides a battery including:

a plastic casing having an inner surface defining a chamber in which an electrolyte is disposed therein;

a conductive surface located within the chamber adjacent the inner surface of the casing, the conductive surface being configured for electrical communication With an anode terminal of the battery;

a permeable separator sheet located within the casing configured for electrically isolating the electrolyte from the conductive surface;

a conductive rod having a first end configured for electrical communication with a cathode terminal of the battery, and, a second end of the conductive rod configured for electrical communication with the electrolyte; and an opening disposed in the casing to allow ingress of a liquid into the chamber to activate the battery by generating a potential difference between the conductive surface and the conductive rod.

Preferably, the plastic may include a recyclable plastic material.

Typically, the conductive surface may include a conductive lining of the casing.

Preferably, the conductive surface may include a zinc material.

Preferably, the conductive surface may include at least one of an abatement, a slot, and a series of apertures extending substantially along an elongate axis of the conductive surface.

Preferably, the at least one of an abatement, a slot and a series of apertures may be formed as a cut-out of the conductive surface.

Preferably, the anode terminal may be disposed in a first end portion of the casing, the first end portion including a combination of a plastic material and a metal material.

Preferably, the plastic region may concentrically surround a core formed by the metal material.

Preferably, the present invention may include a bring configured for positioning within the casing to provide electrical communication between the conductive surface of the casing and the anode terminal.

Preferably, the casing may include at least a first and second portion that are movably attached to each other, the first and second portions being movable relative to each other between at least a first attached position whereby the opening is substantially blocked from allowing ingress of a liquid into the casing via the opening, and, a second attached position whereby the opening is substantially unblocked so as to allow ingress of the liquid into contact with the electrolyte in the chamber via the opening to activate the battery by generating a potential difference between the conductive surface and the conductive rod.

Preferably, the first and second portions may be movable relative to each other by at least one of a sliding, a rotating, a pivoting, a twisting, a pulling and a pushing movement.

Preferably, the first and second portions of the casing may include parts of a valve of the casing for controllably allowing ingress of the liquid into the chamber.

Preferably, the electrolyte may include substantially spherical particles having diameters approximately in the range of around 0.2-0.8 mm.

Preferably, the electrolyte may include particles having densities in the range of approximately 1.71-1.75 g/cm3.

Preferably, the particles may include water content of approximately 3% or less.

In a third broad form, the present invention provides a battery including:

a casing having an inner surface defining a chamber in which an electrolyte is disposed therein;

a conductive surface located within the chamber adjacent the inner surface of the casing, the conductive surface being configured for electrical communication with an anode terminal of the battery;

a permeable separator sheet located within the casing configured for electrically isolating the electrolyte from the conductive surface;

a conductive rod having a first end configured for electrical communication with a cathode terminal of the battery, and, a second end of the conductive rod configured for electrical communication with the electrolyte; and an opening disposed in the casing to allow ingress of a liquid into the chamber to activate the battery by generating a potential difference between the conductive surface and the conductive rod;

wherein the conductive surface in at least one of abatement, a slot, and a series of apertures extending substantially along an elongate axis of the conductive surface.

Preferably, the casing may include a plastic material. More preferably, the plastic may include a recyclable plastic material.

Typically, the conductive surface may include a conductive lining of the casing.

Preferably, the conductive surface may include a zinc material.

Preferably, the at least one of an abatement, a slot and a series of apertures may be formed as a cut-out of the conductive surface.

Preferably, the casing may include at least a first and second portion that are movably attached to each other, the first and second portions being movable relative to each other between at least a first attached position whereby the opening is substantially blocked from allowing ingress of a liquid into the casing via the opening, and, a second attached position whereby the opening is substantially unblocked so as to allow ingress of the liquid into contact with the electrolyte in the chamber via the opening to activate the battery by generating a potential difference between the conductive surface and the conductive rod.

Preferably, the first and second portions may be movable relative to each other by at least one of a sliding, a rotating, a pivoting, a twisting, a pulling and a pushing movement.

Preferably, the first and second portions of the casing may include parts of a valve of the casing for controllably allowing ingress of the liquid into the chamber.

Preferably, the anode terminal may be disposed in a first end portion of the casing, the first end portion including a combination of a plastic material and a metal material.

Preferably, the plastic region may concentrically surround a core formed by the metal material.

Preferably, the present invention may include a spring configured for positioning within the casing to provide electrical communication between the conductive surface of the casing and the anode terminal.

Preferably, the electrolyte may include substantially spherical perfidies having diameters approximately in the range of around 0.2-0.8 mm.

Preferably, the electrolyte may include particles having densities in the range of approximately 1.71-1.75 g/cm3.

Preferably, the particles may include water content of approximately 3% or less.

In a fourth broad form, the present invention includes a battery including:

a casing having an inner surface defining a chamber in which an electrolyte is disposed therein;

a conductive surface located within the chamber adjacent the inner surface of the casing, the conductive surface being configured for electrical communication with an anode terminal of the battery;

a permeable separator sheet located within the casing configured for electrically isolating the electrolyte from the conductive surface;

a conductive rod having a first end configured for electrical communication with a cathode terminal of the battery, and, a second end of the conductive rod configured for electrical communication with the electrolyte; and an opening disposed in the casing to allow ingress of a liquid into the chamber to activate the battery by generating a potential difference between the conductive surface and the conductive rod;

wherein the anode terminal is disposed in a first end portion of the casing, the first end portion including a combination of a plastic material and a metal material.

Preferably, the plastic region may concentrically surround a core formed by the metal material.

Preferably, the present invention may include a spring configured for positioning within the casing to provide electrical communication between the conductive surface of the casing and the anode terminal.

Preferably, the casing may include a plastic material. More preferably, the plastic may include a recyclable plastic material.

Typically, the conductive surface may include a conductive lining of the casing.

Preferably, the conductive surface may include a zinc material.

Preferably, the conductive surface may include at least one of an abatement, a slot, and a series of apertures extending substantially along an elongate axis of the conductive surface.

Preferably, the at least one of an abatement, a slot and a series of apertures may be formed as a cut-out of the conductive surface.

Preferably, the casing may include at least a first and second portion that are movably attached to each other, the first and second portions being movable relative to each other between at least a first attached position whereby the opening is substantially blocked from allowing ingress of a liquid into the casing via the opening, and, a second attached position whereby the opening is substantially unblocked so as to allow ingress of the liquid into contact with the electrolyte in the chamber via the opening to activate the battery by generating a potential difference between the conductive surface and the conductive rod.

Preferably, the first and second portions may be movable relative to each other by at least one of a sliding, a rotating, a pivoting, a Misting, a pulling and a pushing movement.

Preferably, the first and second portions of the casing may include parts of a valve of the casing for controllably allowing ingress of the liquid into the chamber.

Preferably, the electrolyte may include substantially spherical particles having diameters approximately in the range of around 0.2-0.8 mm.

Preferably, the electrolyte may include particles having densities in the range of approximately 1.71-1.75 g/cm3.

Preferably, the particles may include water content of approximately 3% or less.

In a fifth broad form, the present invention provides a method of filling a battery casing with an electrolyte powder including the steps of:
(i) forming the electrolyte powder into substantially spherical-shaped particles having diameters approximately in the range of around 0.2-0.8 mm; and
(ii) channelling the substantially-shaped particles into the battery casing.

Preferably, the substantially spherical-shaped particles may include densities in the range of approximately 1.71-1.75 g/cm3.

Preferably, the substantially spherical-shaped particles may include water content of approximately 3% or less.

Preferably, the step of channelling the particles into the battery casing may include pouring the particles into the battery casing via a funnel.

Preferably, the present invention may include a step of shaking or vibrating the battery casing during or after the particles are channelled into the battery casing.

In a sixth broad form, the present invention provides a battery including a battery casing having an electrolyte powder disposed therein in accordance with the fifth broad form of the present invention.

In a further broad form, the present invention provides a battery including:
a casing having an inner surface defining a chamber in which an electrolyte is disposed therein;
a conductive surface located within the chamber adjacent the nor surface of the casing, the conductive surface being configured for electrical communication with an anode terminal of the battery;
a permeable separator sheet tested within the casing configured for electrically isolating the electrolyte from the conductive surface;
a conductive rod having a first end configured for electrical communication with a cathode terminal of the battery, and, a second end of the conductive rod configured for electrical communication with the electrolyte; and
an opening disposed in the casing;
wherein the casing is configurable between at least one of a first configuration whereby the opening is substantially blocked from allowing ingress of a liquid into the casing via the opening, and, a second configuration whereby the opening is substantially unblocked so as to allow ingress of the liquid into contact with the electrolyte in the chamber via the opening to activate the battery by generating a potential difference between the conductive surface and the conductive rod.

Preferably, the casing includes at least a first and second portion that are movably attached to each other, the first and second portions being movable relative to each other between at least the first configuration whereby the opening is substantially blacked from allowing ingress of a liquid into the casing via the opening, and, the second configuration whereby the opening is substantially unblocked so as to allow ingress of the liquid into contact with the electrolyte in the chamber via the opening to activate the battery by generating a potential difference between the conductive surface and the conductive rod.

BRIEF DESCRIPTION OF THE DRAWINGS

The present invention will become more fully understood from the following detailed description of a preferred but non-limiting embodiment thereof, described in connection with the accompanying drawings, wherein.

DETAILED DESCRIPTION OF PREFERRED EMBODIMENTS

Preferred embodiments of the present invention will now be described with reference to the accompanying drawings 1 to 4. The exemplary embodiments described herein include a battery that is activatable by controllably allowing ingress of a liquid into a chamber of the battery via an opening in the battery casing and into contact with an electrolyte powder (104) within the chamber. Such embodiments may be suitably configured to comply with standard shape and dimension requirements of off-the-shelf type AA and AAA batteries and providing an electrical output which may be comparable to off-the-shelf type AA and AAA batteries.

Figure 1:
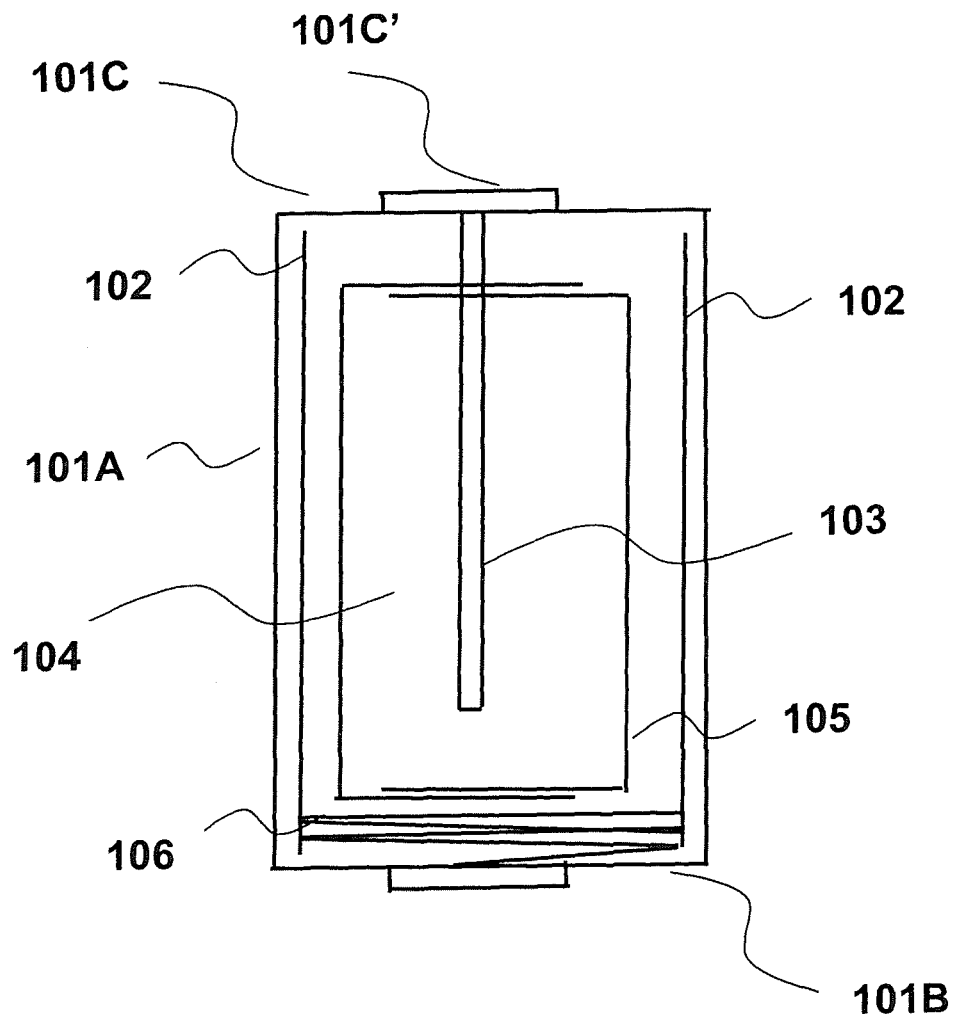
FIG. 1 shows a side cut-away view of a first embodiment battery in accordance With the present invention.

FIG. 1 shows a side cut-away view of a battery in accordance with an embodiment of the present invention. The battery includes a casing (101A, 101B, 101C) made from a biodegradable plastic material which comprises a cylindrical section (101A) disposed between first and second end portions (101B, 101C) which are attached to opposing ends of the cylindrical section (101A) of the casing.

The first end portion (101B), of the casing is configured to be movably attached to the cylindrical section (101A) of the casing so that is movable between at least a first attached position whereby ingress of water is possible via an opening disposed in the casing, and, a second attached position whereby ingress of water in to the casing via the opening in the casing is blocked. When arranged in either of the first and second attached positions, the first end portion (101B) of the casing is configured so as to not be separated or detached from the cylindrical section (101A) of the casing in ordinary use of the battery. In contrast, certain existing water-activated batteries comprise of a battery casing with an end cap that is detachable or separable from the casing (for example, it may be unscrewed from the casing) in order to allow the casing to be filled with water via an opening in the end of the casing. However, when detached or separated from the casing, the end cap of such existing water-activated batteries may be easily lost or misplaced. Accordingly, such a problem may be alleviated by embodiments of the present invention.

Figure 2:
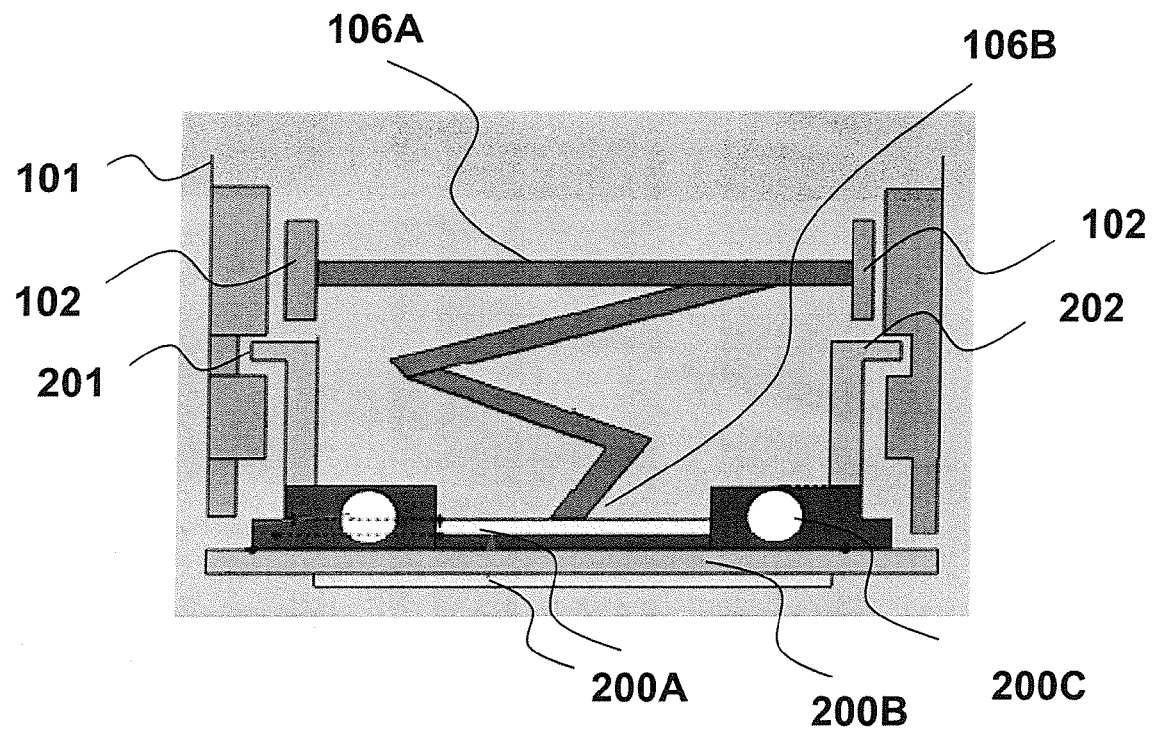
FIG. 2 shows a magnified side cut-away view of a first end of the first embodiment battery illustrating one way in which the first end portion may be movably attached to the cylindrical section of the casing to controllably allow ingress of water into the casing.
Figure 3:
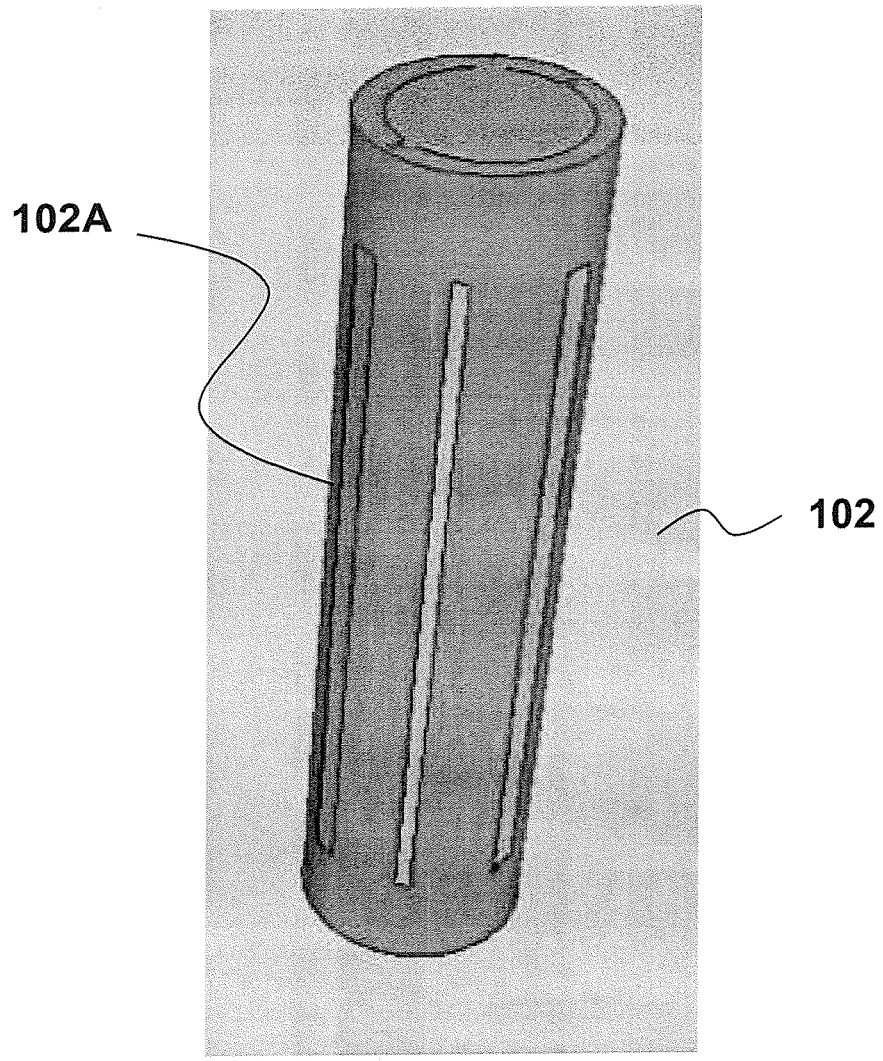
FIG. 3 shows a conductive lining configured for lining the inner surface of the casing in accordance with embodiments of the present invention.

FIG. 2 illustrates an exemplary embodiment in which the first end portion (101B) of the casing is rotatably attached to the cylindrical section (101A) of the casing. In this exemplary embodiment, the first end portion (101B) of the casing includes a lip running (202) around a circumference of the first end portion (101B) whereby during assembly of the battery when the first end portion (101B) is forced inwardly of the cylindrical section (101A), the lip (202) resiliently engages with a corresponding recess (201) running around the inner surface of the cylindrical section (101A) of the casing. With the resilient lip (202) received within the recess (201), the first end portion (101B) is able to be coaxially rotated relative to the cylindrical section (101A) of the casing between at least the first attached position whereby an opening (200C) disposed in the first end portion (101B) and the opening disposed in the cylindrical section (101A) of the casing are configured for alignment. When arranged in this first attached position, ingress of water into the casing is possible via the aligned openings by submerging the battery in to water. Conversely, when the first end portion (101B) of the casing and the cylindrical section (101A) of the casing are rotated into the second attached position, the opening (200C) disposed in the first end portion (101B) and the opening disposed in the cylindrical section (101A) of the casing are no longer in alignment and ingress of water into the casing is no longer possible.

In alternative embodiments of the present invention, the first end portion (101B) of the casing and the cylindrical section (101A) of the casing could be movably attached to each other in other ways to controllably allow ingress of water into the casing without being detached or separated from each other in doing so during ordinary use of the battery. For instance, the first end portion (101B) and the cylindrical section (101A) of the casing could be slidably attached and movable relative to each other between various attached positions to controllably allow ingress of water into the casing. In one such embodiment, when the first end portion (101B) of the casing is pulled outwardly away from the first end of the cylindrical section (101A) of the casing into a first attached position, an opening in the first end portion (101B) and an opening in the cylindrical section (101A) may be in alignment to allow ingress of water in to the casing. Conversely, when the first end portion (101B) is pushed inwardly of the first end of the casing, the openings may no longer be in alignment and this prevents ingress of water into the casing. Yet alternatively, the first end portion (101B) of the casing may be hingedly attached to the cylindrical section (101A) of the casing.

In yet further embodiments, the first end portion (101B) may not necessarily be movably attached to the cylindrical section (101A) of the casing. It is possible for other parts of the casing to be configured for movable attachment relative to each in other ways and configurations to controllably allow ingress of water in to the casing. By way of example, the first and second end portions (101B, 101C) of the casing may be fixed to the respective first and second ends of the cylindrical section (101A) of the casing and not configured to move at all. Instead, an opening in to the casing may be disposed mid-way along the cylindrical section (101A) and the cylindrical section (101A) may comprise first and second movably attached parts to controllably allow ingress of water into the casing via the opening. For ease of manufacture and operation of embodiments of the present invention, suitably shaped and dimensioned off-the-shelf type valve mechanisms such as a "twist type valve" may be incorporated in to the casing of the battery to allow for controllable ingress of water into the casing.

As shown in FIG. 2, the first end portion (101B) of the casing forms the anode terminal (200A) of the battery. Unlike certain other water-activated batteries, the first end portion (101B) is not made entirely from metal and is formed from a novel combination of biodegradable plastic and metal. The novel configuration of the first end portion (101B) comprising a combination of metal (200A) and biodegradable plastic (200B) in embodiments of the present invention provides advantages over existing batteries in terms of reduced cost of production (due to the use of less metal) as well as reduced overall weight of the battery. The metal material forms a core (200A) extending from one side of the first end portion to the other and which is concentrically surrounded by the plastic material (200B). When the first end portion (101B) is attached to the cylindrical section (101A) of the casing, the plastic periphery (200B) of the first end portion (101B) and the plastic material of the cylindrical section (101A) of the casing may be configured for a certain amount of deformable engagement with each other which may tend to provide a better air-tight seal in comparison to certain existing water-activated batteries. That is, in certain existing water-activated batteries which include a metal end cap and a metal casing, the metal-to-metal engagement tends to form a poorer seal. Even with the inclusion of an o-ring (which adds to the cost and complexity of such pre-existing batteries) the air-tight seal may not be as effective as in embodiments of the present invention.

The second end portion (101C) is rigidly fixed to the second end of the cylindrical section (101A) so as to form an air-tight seal between it and the second end of the cylindrical section (101A) of the casing. In certain embodiments, the second end portion (101C) may be integrally molded with the cylindrical section (101A) of the casing from a single-piece of biodegradable plastic. An aperture of approximately 4-6 mm in diameter may be disposed in the centre of the second end portion (101C) which is configured to allow a conductive cathode terminal (101C') to protrude therethrough. The cathode terminal (101C') in this embodiment includes a stainless steel cap (101C') which sits in snug-fitting fashion within the aperture so as to also provide an air-tight seal into the battery chamber. A carbon rod (103) extends inwardly of the battery casing with one end of the carbon rod (103) being fixed to and in electrical communication with the steel cap (101C') and another end of the carbon rod (103) extend into the casing so that it will be in electrical communication with electrolyte (104) within the casing when the casing is filled with the electrolyte (104).

As shown in FIGS. 1 and 2, a cylindrical-shaped conductive lining (102) is positioned within the cylindrical section (101A) of the casing where it lies on or adjacent to an inner surface of the cylindrical section (101A) of the casing to snugly complement the inner surface of the casing. The conductive lining (102) includes 6 spaced-apart cut-out slots (102A) which extend substantially in parallel with each other along an elongate axis of the conductive lining (102). During manufacture of this embodiment of the battery, before the first end portion of the casing is movably attached to the first end of the cylindrical section (101A) of the casing, the conductive lining (102) is inserted into the chamber of the casing via the opened first end of the cylindrical section (101A).

Figure 4:
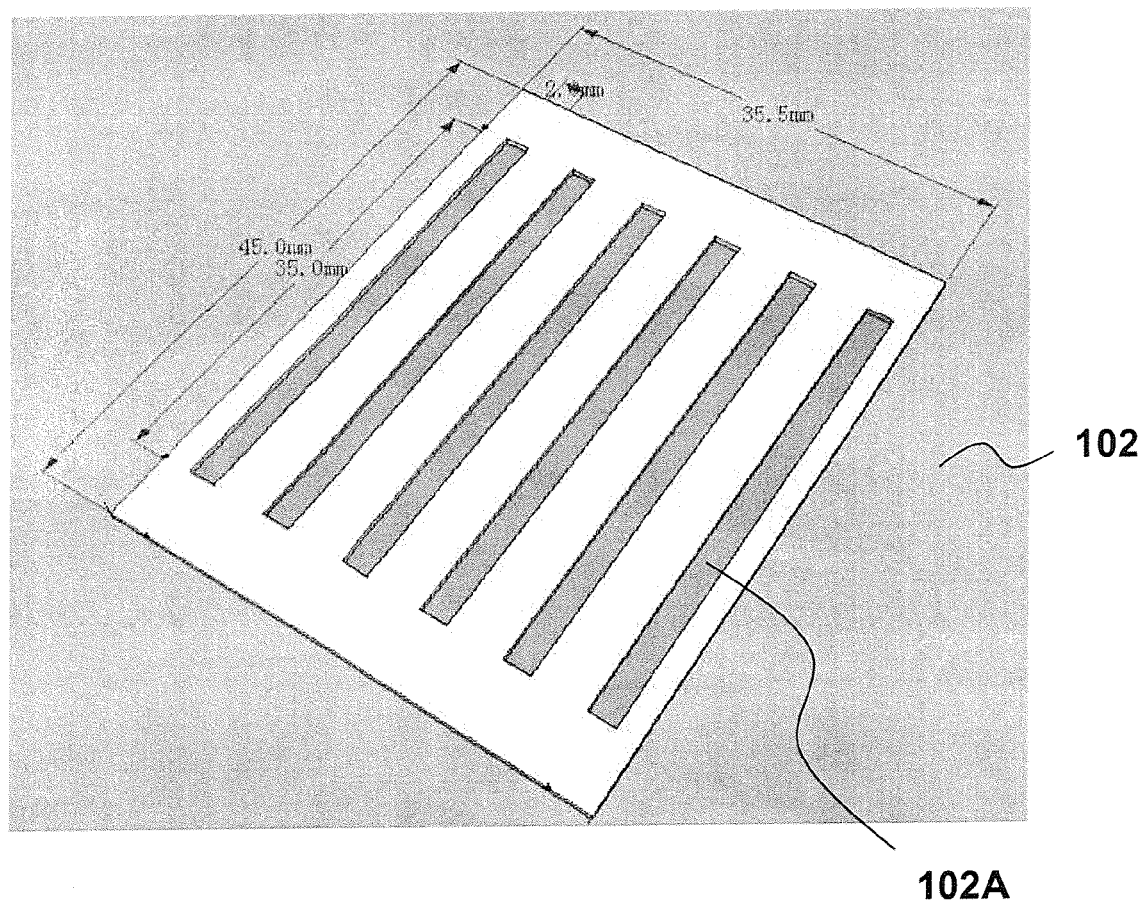
FIG. 4 shows the conductive lining in sheet form before being roiled in to a cylindrical configuration.

The cylindrical-shaped conductive lining (102) is formed by rolling up a zinc sheet such as shown in FIG. 4 having approximate dimensions of 0.5 mm thickness, 45 mm length, and 35.5 mm width. The cut-out slots (102A) each are approximately 35 mm in length, and 2 mm in width. When the zinc sheet is rolled in to a cylinder, the diameter of the zinc lining is approximately 11.3 mm. In alternative embodiment of the present invention, an abatement or a series of holes may extend along the elongate length of the conductive lining instead of a slot. Whilst in this embodiment, the slots are formed as cut-outs in the zinc sheet, it is possible that the slots may be integrally formed in the zinc sheet by use of a molding technique. Yet alternatively, the overall shape and configuration of the conductive lining having the slots, abatements or series of apertures disposed therein may be formed as a composite of two or more different zinc sheets bonded or together using any suitable technique. The novel configuration of the plastic casing having a conductive lining (102) provides advantages over existing batteries which comprise of a full metal casing in terms of reduced cost of production (due to the use of less metal) as well as reduced overall weight of the battery without compromising performance of the battery.

A permeable separator sheet (105) is also located in the battery casing adjacent to the conductive lining, whereby the conductive lining (102) is positioned between the permeable separator sheets (105) and the inner surface of the casing. The permeable separator sheet (105) is formed by rolling a double-layer of 0.08 mm Kraft paper into a cylindrical configuration which can be slid into position within the chamber of the casing during manufacture of the battery when the first end portion (101B) is not yet attached to the first end of the casing. In alternative embodiments, a synthetic or natural polymer material could be used. A portion of the permeable separator sheet (105) which is positioned adjacent the second end of the casing is folded over so as to form an envelope tor containing electrolyte (104) particles that are to be poured in to the battery casing via the first end of the cylindrical section (101A) casing from the first end of the casing before being sealed by the first end portion (101B).

The electrolyte (104) comprises a metal oxide powder such as manganese dioxide, iron oxide or crystalline silver oxide. In this embodiment, the electrolyte includes approximately 3% ammonium chloride particles, 16% zinc chloride particles, 68% manganese dioxide particles, 12.4% acetylene carbon black particles and 0.6% zinc oxide particles by percentage weight of the electrolyte.

The electrolyte (104) is ball-milled using a rotary or planetary bail mill and ceramic balls such as agate (carnelian). During testing, a laboratory ball-milling machine of 500 ml volume was used with ceramic milling balls weighing 110 g and having diameters of 22.4 mm, or, small sized balls weighing 190 g weight and having diameters of 10.0 mm. Also during testing, 150 g of electrolyte was milled on each occasion. It would be understood that the ball milling of the electrolyte (104) can be suitably scaled up to industrial size to accommodate much larger production. Electrolyte particles resulting from the ball-milling have substantially spherical-shaped configurations With diameters approximately in the range of around 0.2-0.8 mm, densities in the range of approximately 1.71-1.75 g/cm3, and water content of approximately 3% or less. Embodiments of the present invention are assembled in a humidity controlled environment, commonly referred to as a "dry room" to alleviate risk of moisture inadvertently activating the electrolyte (104).

When the electrolyte (104) particles have been suitable formed in accordance with the above-described process, the electrolyte (104) particles are poured into the envelope formed by, the permeable separator sheet (105) within the casing of the battery via a funnel whilst the first end portion is not yet attached to the cylindrical section (101A). Certain existing equipment and processes have been used to fill battery casings by funnelling electrolyte powder into the battery casings, however, in contrast to such existing equipment and processes, embodiments of the present invention utilising electrolyte particles as described herein tend to alleviate the incidence of particles clogging in the funnel and hence alleviates occurrence of delays in production of such the batteries. Furthermore, it has been found that the electrolyte particles being shaped and dimensioned in accordance with embodiments of the present invention, tend to naturally allow for water to penetrate through the body of electrolyte within the casing more readily than in other existing water-activated batteries.

During, or after pouring of the electrolyte (104) particles into the permeable separator sheet (105) envelope, the casing is shaken or vibrated so as to assist in settling the electrolyte (104) particles within the permeable separator sheet (105) envelope and maximising the amount of electrolyte (104) particles stored within the casing. Whilst it is possible to also use a plunger to assist in further urging the electrolyte (104) particles into the casing, this step may not be necessary in order for suitable amounts of electrolyte (104) particles to be delivered in to casings of the batteries. When the electrolyte (104) particles have been poured into the envelope formed by the permeable separator sheet (105), the carbon rod (103), which extends from the cathode terminal (101C') inwardly of the casing and into the envelope, is surrounded by the electrolyte (104) particles so as to be in electrical communication with the electrolyte (104).

When the requisite amount of electrolyte has been poured into the casing, the permeable separator sheet (105) folded over the electrolyte (104) particles at the first end of the casing so as to substantially enclose the electrolyte powder (104) in the envelope. FIG. 1 shows a tapered coil spring (106) which is then inserted in to the casing, wherein as shown in FIG. 2, the base (106A) of the coil spring (106) sits upon a folded over portion of the permeable separator sheet (105) enclosing the electrolyte (104), the base (106A) of the coil spring (106) being wide enough to be in electrical communication with the conductive lining (102) within the cylindrical section (101A) of the casing. The tapered end (106B) of the coil spring (106) is configured to be in electrical communication with the metal core (200A) of the first end portion (101B) when the first end portion (101B) is attached to the first end of the casing. Conveniently, the presence of the coil spring (106) not only assists in holding the permeable separator sheet (105) folded over the electrolyte, but also, the coil spring (106) is configured to provide direct electrical communication between the conductive lining (102) and the anode terminal (200A) provided by the metal core (200A) disposed in the first end portion (101B) of the casing. This provides a notable improvement over certain other rater activated batteries in which a "membrane" or "retaining member" are used to hold the permeable separator sheet folded over within the battery, but which does not provide direct electrical communication between the conductive surface within the casing and the battery anode terminal.

Embodiments of the battery once assembled remain in an inactive state until ingress of water into the casing is effected in accordance with the operation of the battery described above. Conveniently, the elongate cut-out slots (102A) provided in the conductive lining (102) allow for water that is delivered in to the casing to flow relatively freely and uniformly along the length of the cylindrical section (101A) of the casing so as to improve overall surface area contact of water with the electrolyte (104) as the water passed from the cut-ort slots (102A) through the permeable separator sheet (105) in to contact with the electrolyte (104). The permeable separator sheet (105) enables wicking of water from regions along the lengths of the cut-out slots (102A) in the conductive lining (102) and thereafter into contact with the electrolyte (104) via the permeable separator sheet (105). In contrast to the certain existing water-activated batteries which may for instance utilise a corrugated metal sheet within the casing in order to channel water along the battery casing via the troughs in the corrugation, the use of cut-out slots (102A) in the conductive lining (102) in embodiments of the present invention tends to provide at least a comparable water flow within the casing whilst at the same time alleviating loss of electrolyte storage volume within the casing. Also, the use of cut-out slots (102A) in the conductive lining (102) (in contrast to the use of a corrugated configuration in the conductive sheet of existing batteries) may result in use of less overall metal which again reduces overall costs per unit of manufacture and overall weight of batteries in accordance with embodiments of the present invention.

Once water has suitably contacted with the electrolyte in the casing, the activated electrolyte (104) chemically reacts with the conductive lining (102) via the permeable sheet (105) whereby a potential difference is generated between the electrically-isolated conductive rod (103), and, the conductive lining (102). Whilst the permeable separator sheet (105) disposed between the conductive lining (102) and the conductive rod (103) physically and electrically isolates them from each other, it does allows for free flow of positive ions therethrough that have been produced as a result of the chemical reactions in a direction from the conductive lining (102) through the permeable separator sheet (105) towards the conductive rod (103) so as to continue to generate and maintain the potential difference. Electrons are therefore able to flow from the battery through a toad device so as to power the load device.

Advantageously, due to battery embodiments of the present invention being kept in an inactive state until use, such battery embodiments enjoy a shelf-life of considerably longer duration than conventional off-the-shelf type batteries intended for similar use. In contrast, conventional type batteries tend to deteriorate in performance much faster when in storage due to the electrolyte powder mixture being activated at the point of manufacture. Whilst embodiments of the present invention described herein are particularly well-suited for and intended for use during emergency situations due to the longer shelf-life, the actual output performance of such battery embodiments may be comparable or superior to the power output expected of certain conventional batteries.

Also advantageously, the structural design and material composition of batteries in accordance with embodiments of the present invention assists in providing ease of reusability and recyclability of the component parts. The various parts of the battery can be rapidly and efficiently detached from one another by use of an automated machine. Thereafter, the separated parts can be collected and returned to a factory for re-use in the manufacture of new batteries instead of incurring time, costs and energy in recycling such parts. Further cost savings may be obtained by collecting these re-usable component parts and shipping them in bulk to a factory in a relatively cost-effective manufacturing jurisdiction.

Those skilled in the art will appreciate that the invention described herein is susceptible to variations and modifications other than those specifically described without departing from the scope of the invention. All such variations and modification which become apparent to persons skilled in the art, should be considered to fall within the spirit and scope of the invention as broadly hereinbefore described. It is to be understood that the invention includes all such variations and modifications. The invention also includes all of the steps and features, referred or indicated in the specification, individually or collectively, and any and all combinations of any two or more of said steps or features.

The reference to any prior art in this specification is not, should not be taken as, an acknowledgment or any form of suggestion that that prior art forms part of the common general knowledge.

The invention claimed is:

1. A battery including:
   a casing having an inner surface defining a chamber in which an electrolyte is disposed therein;
   a conductive surface located within the chamber adjacent the inner surface of the casing, the conductive surface being configured for electrical communication with an anode terminal of the battery;
   a permeable separator sheet located within the casing configured for electrically isolating the electrolyte from the conductive surface;
   a conductive rod having a first end configured for electrical communication with a cathode terminal of the battery, and, a second end of the conductive rod configured for electrical communication with the electrolyte; and
   an opening disposed in the casing;
   wherein the casing includes at least a first and second portion that are movably attached to each other, the first and second portions being movable relative to each other between at least a first attached position whereby the opening is substantially blocked from allowing ingress of a liquid into the casing via the opening, and, a second attached position whereby the opening is substantially unblocked so as to allow ingress of the liquid into contact with the electrolyte in the chamber via the opening to activate the battery by generating a potential difference between the conductive surface and the conductive rod.

2. A battery as claimed in claim 1 wherein the first and second portions are movable relative to each other by at least one of a sliding, a rotating, a pivoting, a twisting, a pulling and a pushing movement.

3. A battery as claimed in claim 1 wherein the first and second portions of the casing include parts of a valve of the casing for controllably allowing ingress of the liquid into the chamber.

4. A battery as claimed in claim 1 wherein the casing includes a plastic material.

5. A battery as claimed in claim 1 wherein the conductive surface includes a conductive lining of the casing.

6. A battery as claimed in claim 5 wherein the conductive surface includes a zinc material.

7. A battery as claimed in claim 1 wherein the anode terminal is disposed in a first end portion of the casing, the first end portion including a combination of a plastic material and a metal material.

8. A battery as claimed in claim 7 wherein the plastic region concentrically surrounds a core formed by the metal material.

9. A battery as claimed in claim 1 including a spring configured for positioning within the casing to provide electrical communication between the conductive surface of the casing and the anode terminal.

10. A battery as claimed in claim 1 wherein the electrolyte includes substantially spherical particles having diameters approximately in the range of around 0.2-0.8 mm.

11. A battery as claimed in claim 10 wherein the electrolyte includes particles having densities in the range of approximately 1.71-1.75 g/cm3.

12. A battery including:
- a plastic casing having an inner surface defining a chamber in which an electrolyte is disposed therein;
- a conductive surface located within the chamber adjacent the inner surface of the casing, the conductive surface being configured for electrical communication with an anode terminal of the battery;
- a permeable separator sheet located within the casing configured for electrically isolating the electrolyte from the conductive surface;
- a conductive rod having a first end configured for electrical communication with a cathode terminal of the battery, and, a second end of the conductive rod configured for electrical communication with the electrolyte; and
- an opening disposed in the casing to allow ingress of a liquid into the chamber to activate the battery by generating a potential difference between the conductive surface and the conductive rod.

* * * * *